United States Patent [19]

Timko et al.

[11] Patent Number: 5,577,219

[45] Date of Patent: Nov. 19, 1996

[54] METHOD AND APPARATUS FOR PREFORMING MEMORY SEGMENT LIMIT VIOLATION CHECKS

[75] Inventors: Mark Timko, Portland; Scott D. Rodgers, Hillsboro, both of Oreg.

[73] Assignee: Intel Corporation, Santa Clara, Calif.

[21] Appl. No.: 236,587

[22] Filed: May 2, 1994

[51] Int. Cl.⁶ .............................. G06F 9/355; G06F 12/06
[52] U.S. Cl. ......................................... 395/411; 395/421.1
[58] Field of Search ..................................... 395/490, 410, 395/418, 411, 421.1

[56] References Cited

U.S. PATENT DOCUMENTS

| | | | |
|---|---|---|---|
| 3,814,919 | 6/1974 | Repton et al. | 371/16.1 |
| 4,442,484 | 4/1984 | Childs, Jr. et al. | 395/490 |
| 4,837,738 | 6/1989 | Lemay et al. | 395/421.1 |
| 4,851,989 | 7/1989 | Kamigasa et al. | 395/416 |
| 5,144,551 | 9/1992 | Cepulis | 395/490 |
| 5,274,834 | 12/1993 | Kardach et al. | 395/800 |
| 5,321,836 | 6/1994 | Cranford et al. | 395/416 |
| 5,408,626 | 4/1995 | Divit | 395/421.1 |
| 5,418,956 | 5/1995 | Willman | 395/700 |

OTHER PUBLICATIONS

*Intel 486™ Microprocessor Family Programmer's Reference Manual*, Intel, pp. 2–15–1–16, 22–1–22–12 (1992).
*Pentium™ Processor User's Manual vol. 3: Architecture and Programming Manual*, Intel, pp. 9–1–9–4, 3–15–3–16 (1994).
*Intel's Microprocessor and Peripheral Handbook*, vol. 1, 1989, pp. 4–13, 4–14, and 4–26 to 4–28.

*Primary Examiner*—Jack A. Lane
*Attorney, Agent, or Firm*—Blakely, Sokoloff, Taylor & Zafman

[57] ABSTRACT

A method and apparatus for determining if an effective address for a memory access in a computer processor is above an expand-down memory segment. The apparatus comprises a memory segment limit comparison circuit. The segment limit comparison circuit tests every memory access to determine if the memory access reaches above the top limit of an expand-down memory segment. The comparison circuit consists of an adder that adds an effective address of the memory access to an access_size value. The access_ size value consists of the size of the memory access to be performed minus one in the low order bits and a series of "1" bits in the high order bits necessary to generate a carry if the memory access reaches above the top limit of the expand-down memory segment.

11 Claims, 5 Drawing Sheets

Error if effective_address+(size-1)>Limit

Error if (effective_address≤Top-Limit) or (address+(size-1)>($2^n$-1))

METHOD AND APPARATUS FOR PREFORMING MEMORY SEGMENT LIMIT VIOLATION CHECKS

FIELD OF THE INVENTION

The present invention relates to memory segmentation. More specifically, the present invention relates to a limit violation check for segmented memory.

BACKGROUND OF THE INVENTION

Memory segmentation is a method of organizing computer memory that divides the memory into variable sized segments. Typically, each memory segment stores information containing common attributes such as location, size, type (i.e. stack, code or data) and protection characteristics.

In an Intel® architecture microprocessor, memory is organized into one or more variable length segments. Each memory segment comprising up to four gigabytes in size. Segmentation allows management of the logical address space by providing data and code relocatability and efficient sharing of global resources. The segmentation unit provides four levels of protection for isolating and protecting application programs and the operating systems from conflict in the address space. The Intel® architecture microprocessor hardware enforced protection allows the design of systems with a high degree of integrity.

Memory segments in an Intel® architecture microprocessor are addressed using linear addresses. A linear address consists of an effective address combined with a segment base address. The segment base address is stored in a segment register. The effective address is formed by summing all of the addressing components (base, index, displacement) into an effective address with an effective address calculator.

When the effective address calculator of the microprocessor generates an effective address to address a memory segment, the microprocessor must test the effective address to ensure that it falls within the memory segment to be accessed. If the effective address does not fall within the memory segment to be accessed, a segment violation occurs and the processor enters an exception handling routine.

SUMMARY AND OBJECTS OF THE INVENTION

It is an object of the present invention to provide a fast and efficient method for determining whether an effective address for addressing an expand-down memory segment is above the top limit of the expand-down memory segment.

The present invention accomplishes the above objective with a memory segment limit comparison circuit. The segment limit comparison circuit tests each memory access to determine if the memory access requests memory outside a defined memory segment. The comparison circuit consists of an adder that adds a 32 bit effective address of the memory access to a 32 bit access_size value. The access_size value consists of the size of the memory access to be performed minus one in the low order bits and a series of all "1" bits or all "0" bits in the high order bits depending on status of the D-Bit in the processor. If the D-Bit indicates a 64K segment, the segment limit comparison circuit places all "1" bits in the high order bits to propagate a carry bit if the memory access reaches above the defined memory segment.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for performing a segment limit violation test in a microprocessor are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily. The present invention is disclosed in the context of an Intel® architecture microprocessor, however, the teachings of the present invention are applicable to any microprocessor that performs memory segment limit violation tests.

Memory Segmentation

The present invention comprises a segment limit violation tester in a memory segmentation unit for an Intel® architecture microprocessor. Memory segmentation allows management of the logical address space by providing data and code relocatability and efficient sharing of global resources. For the Intel® architecture microprocessor, memory is organized into one or more variable length segments, each comprising up to four gigabytes in size. Typically, each memory segment stores information containing common attributes such as location, size, type (i.e. stack, code or data) and protection characteristics. The segmentation unit provides four levels of protection for isolating and protecting application programs and the operating systems from conflict in the address space. The Intel® architecture microprocessor hardware enforced protection allows the design of systems with a high degree of integrity.

Memory segments in an Intel® architecture microprocessor are addressed using linear addresses. A linear address consists of an effective address combined with a segment base address. The segment base address is stored in a segment register. The effective address is calculated by adding a base address, an index multiplied by a scale, and a displacement together. Expressed as an equation, the effective address is calculated:

Effective Address=(Base Address+(Index*Scale)+Displacement)

Figure 1:
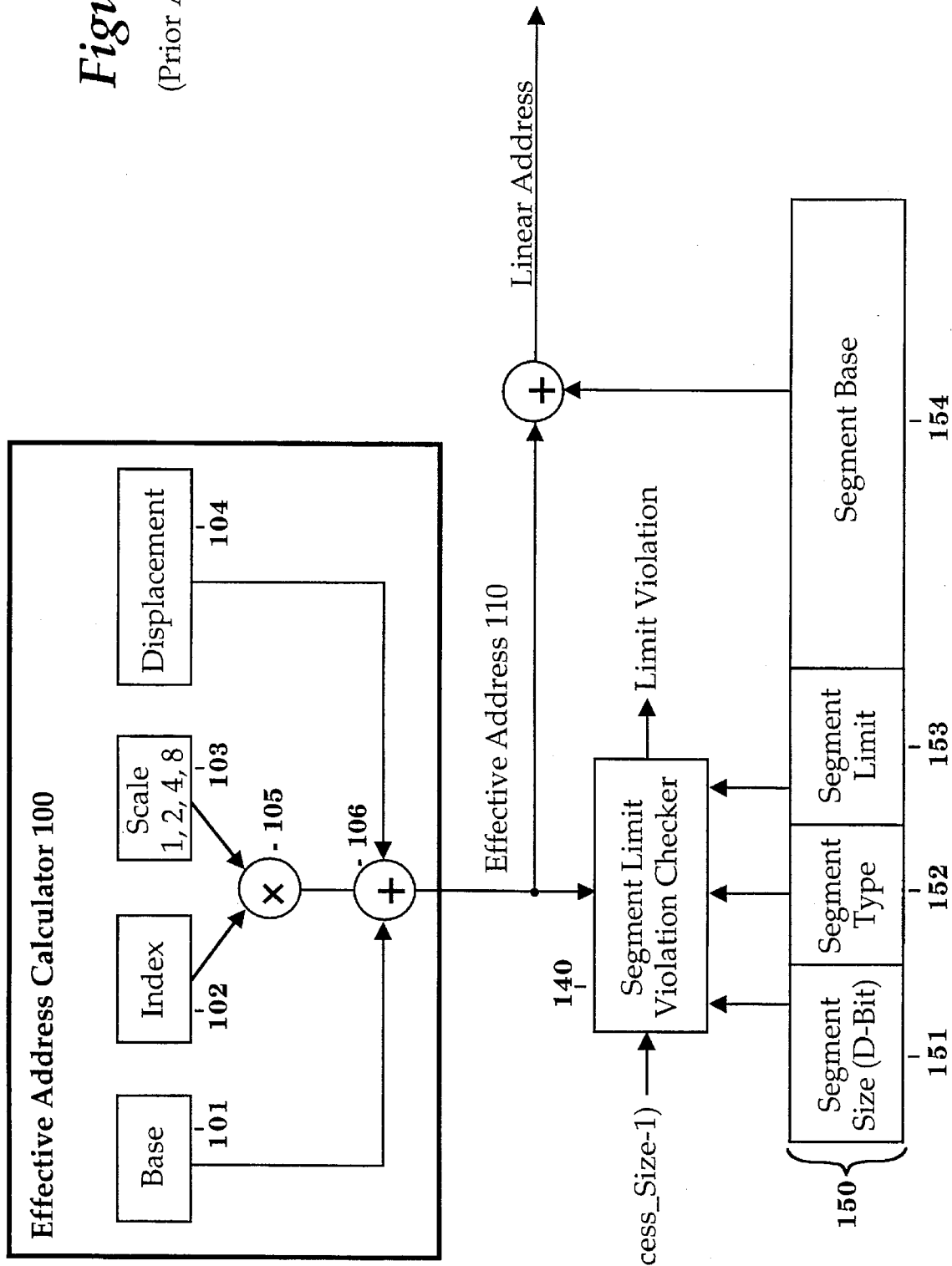
FIG. 1 illustrates a prior art effective address calculator; and a prior art segment limit violation checker.

FIG. 1 illustrates a prior art effective address calculator 100. As illustrated in FIG. 1, the Index 102 is multiplied by the scale 103 at multiplier 105. Since the scale 103 in FIG. 1 can only be 1, 2, 4, or 8, the multiplier 105 can be implemented as a left shifter that shifts the index 102. After multiplying the Index 102 with the scale 103, the product is added to the base address 101 and the displacement 104. The resulting sum is the Effective Address 110.

On every memory access, the address generation unit must perform some checks to ensure that the effective address 110 does not create a segment limit violation. Specifically, the address generation unit must ensure that the every byte being accessed falls within the defined memory segment.

FIG. 1 illustrates an segment limit violation checker 140. The segment limit violation checker 140 uses the effective address 110 and the size of the access to determine the bytes that will be accessed. The segment limit violation checker 140 uses the segment size 151, the segment type 152, and the segment limit 153 to determine the address range of memory segment. The segment limit violation checker 140 determines if all the bytes that will be accessed fall within the defined memory segment.

Segment Violation Checks

Figure 2A:
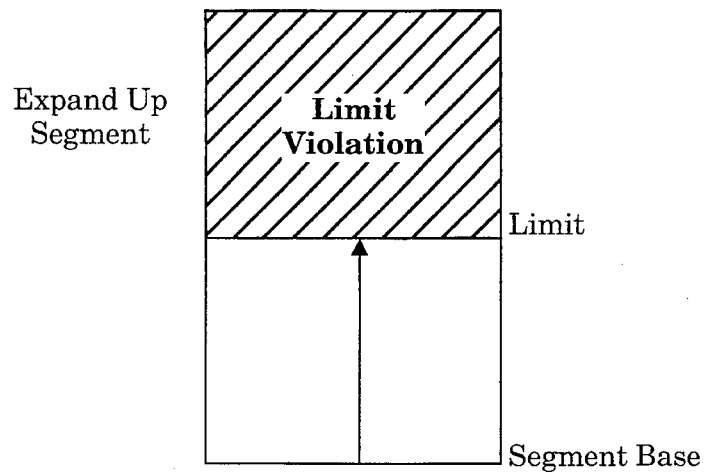
FIG. 2a illustrates a prior art expand-up memory segment.
Figure 2B:
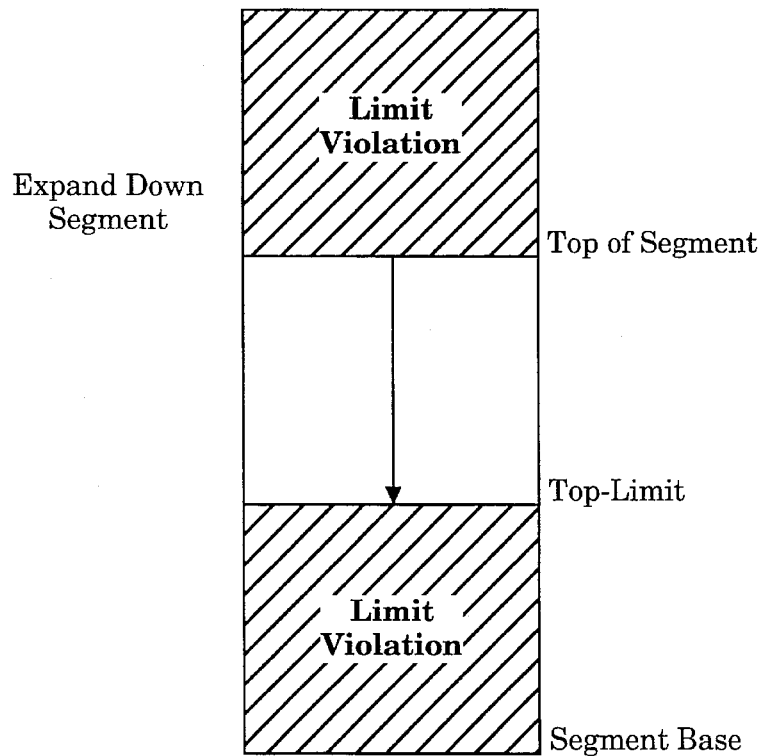
FIG. 2b illustrates a prior art expand-down memory segment.

The Segment Limit Violation checks that the segment limit violation checker 140 performs differ depending on the type of segment specified in the segment type field 152. There are two types of memory segments: expand-up segments and expand-down segments. FIGS. 2a and 2b illustrate the different checks performed.

FIG. 2a illustrates an expand-up memory segment. An expand-up memory segment is defined by a segment base and a limit. The segment base defines the lowest address of the memory segment. The limit defines the size of the memory segment. In an expand-up memory segment, an address generation unit must test if the effective address plus the size of the access request minus 1 exceeds the limit size. [Is effective_address+size−1>limit?] If this is true, then the memory access is outside of the memory segment and a segment violation has occurred.

FIG. 2b illustrates an expand-down memory segment. An expand-down memory segment is defined by a top address and a limit. The top address defines the highest address of the memory segment. The limit defines the size of the memory segment. In an expand-down memory segment, the memory segment is defined by the top address as an upper boundary and the top address minus the limit as a lower boundary. For expand-down memory segments, an address generation unit must perform two tests to determine if a segment violation has occurred. To test if the address is below the memory segment, the address generation unit determines if the effective address is less than or equal to the limit. [Is effective_address≦limit?] To test if the memory access reaches above the memory segment, the address generation unit determines if the effective address plus the size of the access request minus 1 is greater than the top address. [Is effective_address+(access_size−1)>top_address?] If either of these tests is true, then the memory access is outside the boundary of the expand-down memory segment and a segment limit violation has occurred.

In Intel® Architecture microprocessors, the top address of an expand-down memory segment is defined as an address that is 64K ($2^{16}-1$) or 4 Gb ($2^{32}-1$) above the segment base.

In Intel® Architecture microprocessors, the size of the memory segment is determined by a D-Bit, wherein D-Bit=0 indicates a 64K limit and D-Bit=1 indicates a 4 Gb limit. The top address is computed as:

top_address=(segment_base_address+$2^{16}$−1) if D-Bit=0; or top_address=(segment_base_address+$2^{32}$−1) if D-Bit=1

A segment limit violation will occur if the last byte of the memory access addresses a memory location above the top_address for an expand-down segment.

The present invention teaches methods and apparatus for performing the test that determines if a memory segment access reaches above the top_address of an expand-down memory segment.

Prior Art Segment Violation Checker

Prior art architectures have checked for memory accesses above an expand-down memory segment by adding the Effective Address and the number of bytes being accessed (1 byte, 2 bytes, 4 bytes, etc.) minus one and looking for a carry bit generated by the addition. If the D-Bit=0, then the address generation unit looked for a carry out of the 16th bit indicating an address outside of the 64K segment limit. If the D-Bit=1, then the address generation unit looked for a carry out of the 32nd bit indicating an address outside of the 4 Gb segment limit.

However, that implementation does not cover every possible segment violation case. It is possible that the Effective Address alone is above the memory segment address space limit. In that case, no carries may be produced by the addition even though a memory segment limit violation has occurred. Remedying this problem requires adding logic that checks for non-zero bits in the upper 16 bits of the effective address if the D-Bit=0 and signaling a segment limit violation if any non-zero bits are found.

Figure 3:
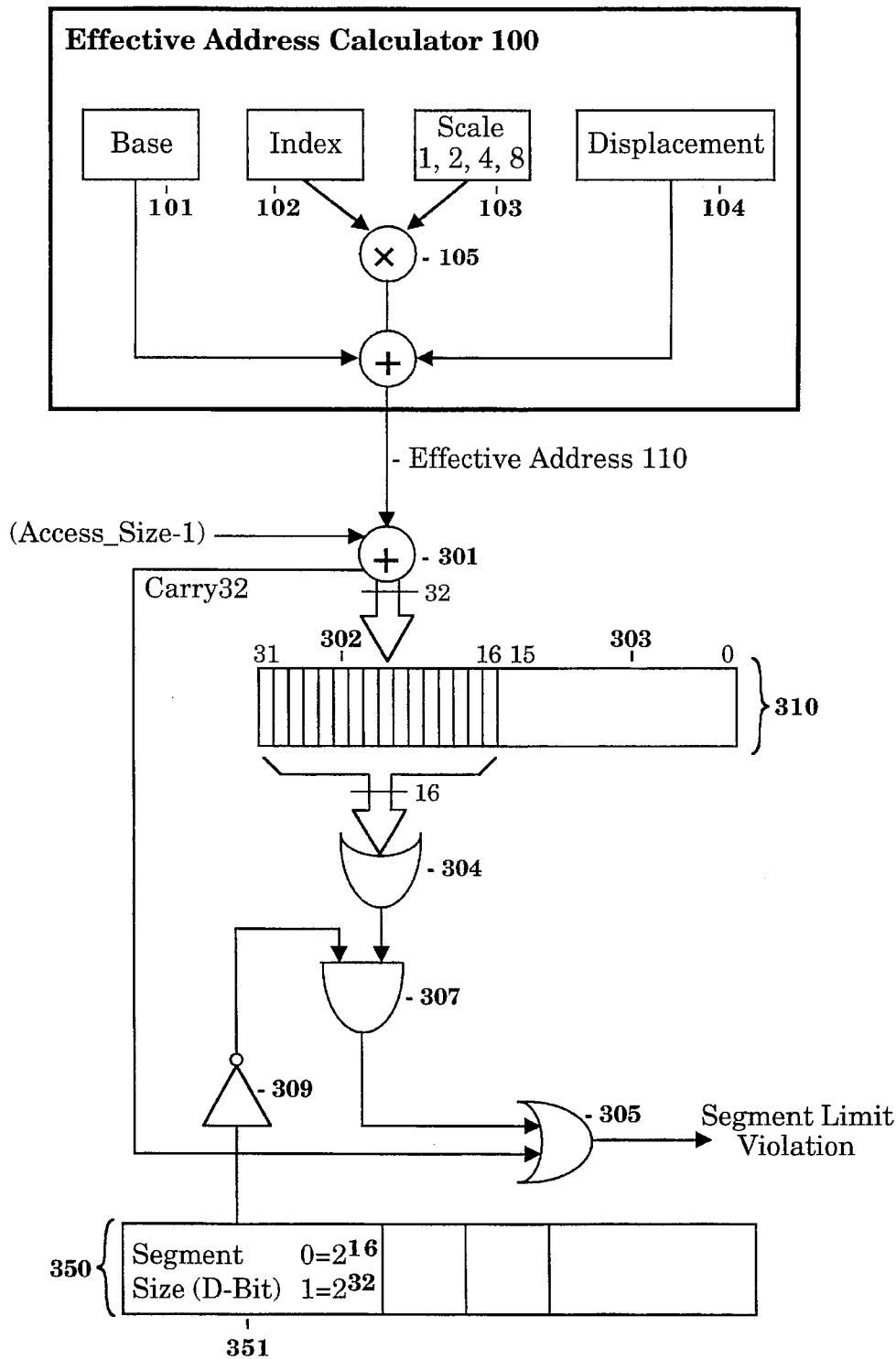
FIG. 3 illustrates a prior art apparatus for testing if an effective address is above the top limit an expand-down memory segment.

FIG. 3 illustrates a prior art implementation of this type of limit violation checking system. Referring to FIG. 3, an Effective Address Calculator 100 generates an effective address 110. The size of the memory access minus one (access_size−1) is added to the effective address 110 at adder 301 and stored in a result register 310.

If the addition at adder 301 generates a carry bit due to a sum that cannot fit within a 32 bit word, then a segment limit violation has occurred. This is true for both 64K segments and 4 Gb segments.

However, to check for memory accesses above the top_address in 64K expand-down memory segments, every bit in the upper 16 bits of the sum in result register 310 must be tested since the address should not exceed $2^{16}-1$. In the effective address checker of FIG. 3, all the bits in the upper 16 bits of the result register 310 are logically combined at OR gate 304. The OR gate 304 determines if any bit in the upper 16 bits of the result register 310 is a "1" that would indicate an address greater than 64K ($2^{16}-1$). The result of the OR gate 304 is combined at AND gate 307 with the inverted D-bit 351 that specifies if the memory segment is a 64K segment such the result of OR gate 304 is propagated if the memory segment is a 64K segment. Finally, OR gate 305 generates a segment limit violation signal if a carry is generated by adder 301 or the memory segment is a 64K segment and the effective address is greater than 64K ($2^{16}-1$).

As illustrated in FIG. 3, the prior art effective address checker must perform different tests depending of if the memory segment is a 64K segment or a 4 Gb segment. For 64K segments, every bit in the upper 16 bits of the effective address must be tested, thus a large zero detect circuit is required.

Improved Segment Violation Checker

The present invention teaches a segment violation check apparatus that tests if an effective address exceeds the top_address of an expand-down memory segment. The segment limit violation check apparatus of the preferred embodiment does not require different combinational logic for 64K segments and 4 Gb segments. Furthermore, the apparatus of the preferred embodiment requires no zero detect hardware. (Note that another segment limit violation check apparatus is still required to test if a memory access is below the lower boundary of the expand-down memory segment.)

The basic check that this implementation is trying to perform can be written as:

Segment violation=$2^{(n)}-1$<effective_address+(Access_size$-1$) where n=16 or 32

The "n=16 or 32" portion of the equation is decided based on the segment size (64K or 4 Gb). In an Intel® architecture microprocessor, the top limit of an expand-down memory segment is determined by the D-Bit in a segment register. A D-bit value of "1" indicates a 4 Gb ($2^{32}$) memory segment and a D-Bit value of "0" indicates a 64K ($2^{16}$) memory segment. As illustrated in FIG. 3, prior art solutions require different comparison logic depending on the status of the D-Bit.

The present invention implements a single comparison apparatus that determines if an access is above the top_address for both 64K (D-Bit=0) and 4 Gb expand-down segments (D-Bit=1) without adding additional logic. The addition in the equation listed above combines an Effective Address that is 32 bits long and the size of the memory access (Access_size) that is at most 5 bits long. Since this addition requires a 32 bit adder, the upper 27 bits of the Access_size would normally be assigned to zero.

When the D-Bit is zero (indicating a 64K memory segment), the segment violation checker must determine if the effective address plus the access_size$-1$ is greater than $2^{16}-1$. However, the carry out bit from the 16th bit does not alone indicate this. To solve this problem, the apparatus of the present invention concatenates the complement of the D-Bit into the upper 16 bits of the access_size and determines if a segment limit violation occurred by testing the carry out bit from the 32nd bit for both cases of D-Bit values.

Figure 4:
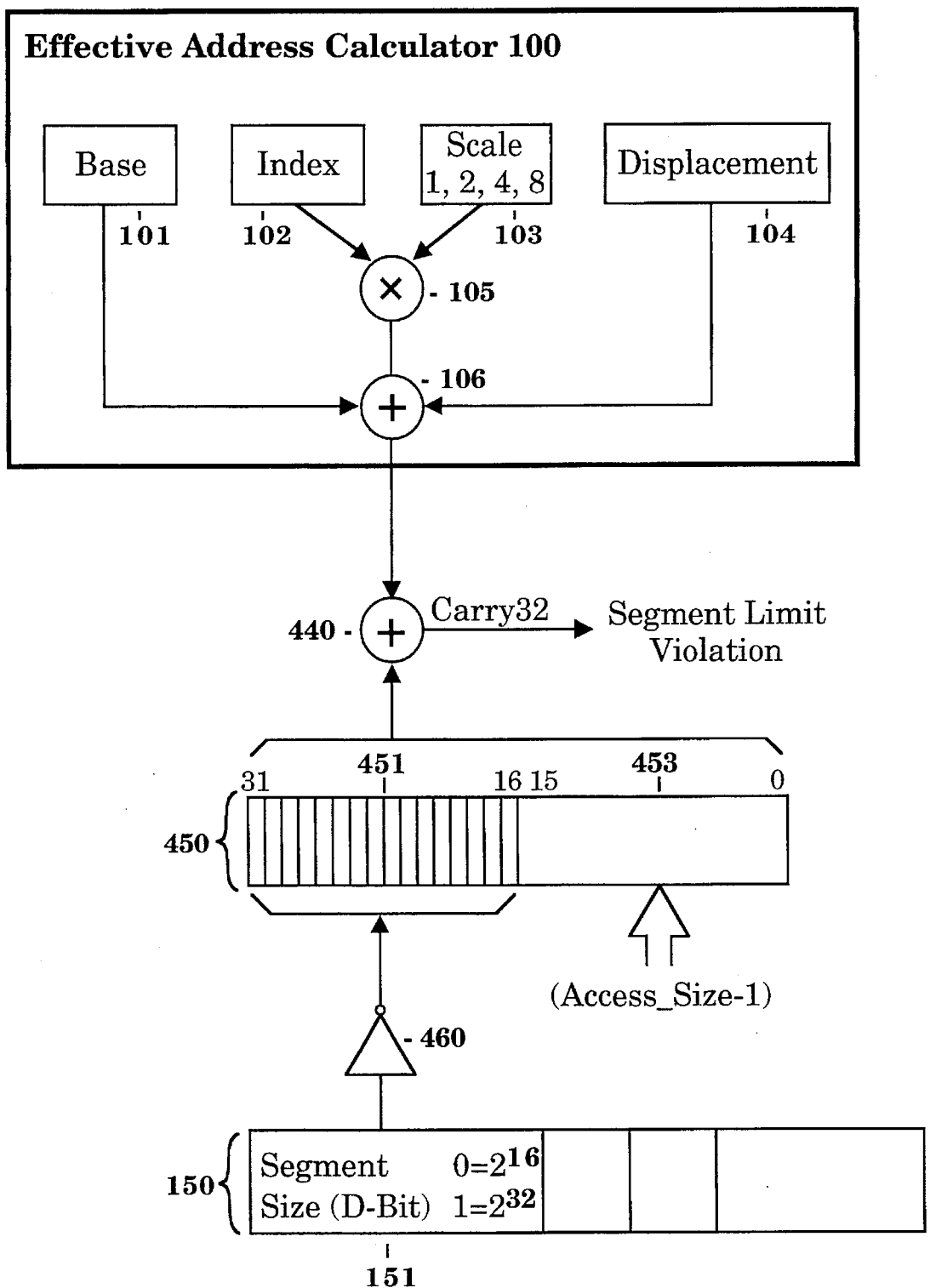
FIG. 4 illustrates an apparatus for testing if an effective address exceeds the top segment limit for an expand-down segment.

FIG. 4 illustrates a segment limit violation checker implemented according to the teachings of the present invention. As illustrated in FIG. 4, a 32 bit word is created in a register 450 with the size of the memory access minus one (Access_size-1) in the lowest 16 bits 453. The upper 16 bits 451 of the 32 bit word 450 are filled with the D-bit 151 after passing the D-bit through an inverter 460.

The 32 bit word 450 comprising the sixteen inverted D-bits in the upper 16 bits and the Access_size$-1$ in the lower 16 bits is added to the effective address at adder 440. If the sum from the addition at adder 440 generates a carry from the 32nd bit, then the memory access is reaching above the top address of the expand-down memory segment causing a segment limit violation. Thus the carry 32 signal from the adder 440 is an indicator of a segment limit violation.

In the case of where the D-Bit 151 is zero (indicating a 64K memory segment), sixteen "1" bits are placed into the upper bits of the 32 bit word 450 along with the Access_size minus one. If a carry is generated out of the lower 16 bits of the addition, the carry will propagate out to the 32nd bit and so that the carry out of the 16th bit of the sum does not need to be examined. The "1"s in the upper 16 bits will also cause a carry to be propagated out of the 32nd bit if any of the upper 16 bits of the Effective_Address are set to one. This allows the circuit of the present invention to detect all memory accesses that are above the top_address of 64K expand-down memory segments without any zero detect hardware.

In the case where the D-Bit is one (indicating a 4 Gb memory segment), sixteen "0" bits are placed in the upper 16 bits of the Access_size. In this manner, the segment limit violation checker of the present invention works the same as before (placing zero's on the upper bits when D-Bit=1).

The segment limit violation checking apparatus of the present invention is best explained with the use of examples:

EXAMPLE 1

A segment limit violation with D-Bit=0 (64Kb segment), Effective Address<$2^{16}$, and a 4 byte access.

Effective Address = 0000 0000 0000 0000 1111 1111 1111 1110
Access_size-1 =    1111 1111 1111 1111 0000 0000 0000 0011
Carry out32 =      1

In this first example, the effective address is within the memory segment, but the 4 byte access reaches beyond the 64K memory segment boundary. Thus a carry is generated in the sixteen bit. The sixteen "1" bits in the Access_size-1 propagate the carry bit out of the 32nd bit thereby generating a segment limit violation.

EXAMPLE 2

A segment limit violation with D-Bit=0 (64Kb segment), Effective Address>$2^{16}$, and a one byte access.

Effective Address = 0000 0100 0000 0000 0011 1101 1011 1110
Access_size-1 =    1111 1111 1111 1111 0000 0000 0000 0000
Carry out32 =      1

In this example, the effective address does not fall within the 64K memory segment. The most significant "1" bit in the effective address combined with the sixteen "1" bits in the Access_sized propagate a carry bit out of the 32nd bit thereby generating a segment limit violation.

EXAMPLE 3

No segment limit violation with D-Bit=0 (64Kb segment), Effective Address<$2^{16}$, and a 4 byte access.

Effective Address = 0000 0000 0000 0000 0011 1101 1011 1110
Access_size-1 =    1111 1111 1111 1111 0000 0000 0000 0011
Carry out32 =      0

In this example, the sum of the effective address and the access_size$-1$ falls within the 64K memory segment. Thus no carry is generated and no segment limit violation is detected.

EXAMPLE 4

A segment limit violation with D-Bit=1 (4 Gb segment), Effective Address<$2^{32}$, and a 16 byte access.

Effective Address = 1111 1111 1111 1111 1111 1111 1111 1110
Access_size-1 =    0000 0000 0000 0000 0000 0000 0000 1111
Carry out32 =      1

In this example, the sum of the effective address and the access_size−1 is greater than 4 Gb the memory segment boundary. Thus a carry is generated and a segment limit violation is generated.

EXAMPLE 5

No segment limit violation with D-Bit=1 (4 Gb segment), Effective Address<$2^{32}$, and a 4 byte access.

```
Effective Address = 0010 0100 1010 0000 0011 1101 1001 1110
Access_size-1 =     0000 0000 0000 0000 0000 0000 0000 0011
Carry out32 =       0
```

In this example, the sum of the effective address and the access_size−1 is within the 4 Gb memory segment. Thus no segment limit violation is detected.

Figure 5:
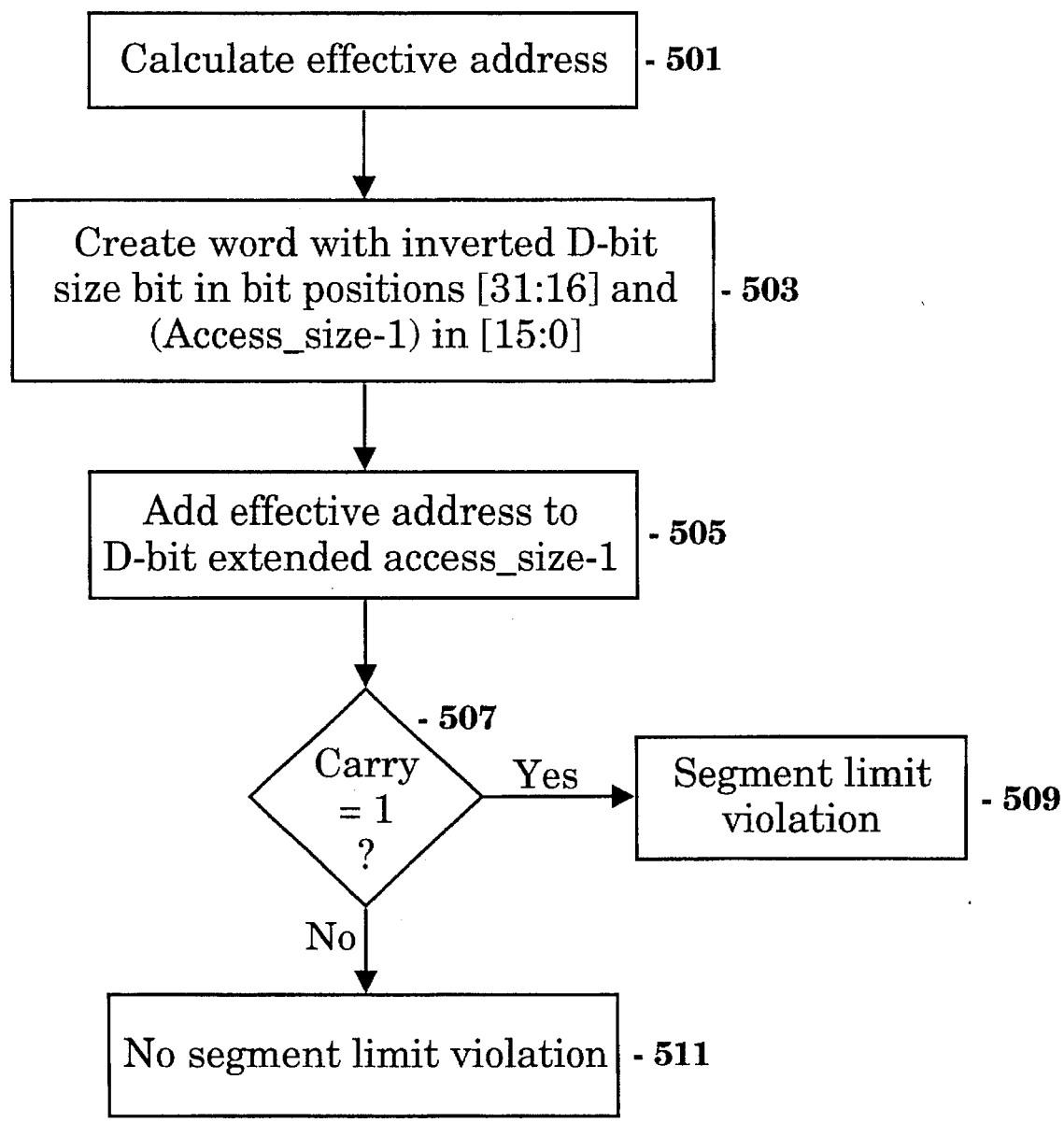
FIG. 5 illustrates a flow diagram of the method for testing if an effective address exceeds the top segment limit for an expand-down segment.

FIG. 5 illustrates a flow diagram explaining the steps performed in the preferred embodiment of a segment limit violation check that tests if a memory address is above an expand-down memory segment. First, at step 501, the effective address of the memory access is calculated. At step 503, the segment limit violation checker constructs a 32 bit word comprising the inverted D-bit in the most significant sixteen bits and the access_size−1 in the least significant 16 bits. In the preferred embodiment, steps 501 and 503 are performed by the segment limit violation checker concurrently.

At step 505, the effective address of the memory access is added to the 32 bit word with the inverted D-bit in the upper sixteen bits and the access_size−1 in the lower 16 bits. At step 507, the carry from the 32nd bit of the addition is tested. If the carry bit is "1", then a segment limit violation is indicated at step 509. Otherwise, if the carry bit is "0", then no segment limit violation is indicated at step 511.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of testing if a memory access falls above a defined memory segment, said memory access having a memory access size, said method comprising the steps of:

generating an effective address for said memory access;

concatenating a set of high order bits onto said memory access size minus one to create an access_size, said set of high order bits for propagating a carry bit from said access_size if said effective address of said memory access reaches above said defined memory segment;

adding said access_size to said effective address; and signaling a segment limit violation if said carry bit is generated from said step of adding.

2. The method of testing a memory access as claimed in claim 1 wherein said defined memory segment has a size of 64Kilobytes and said step of concatenating a set of high order bits comprises the substeps of:

placing sixteen "1" bits into a sixteen most significant bits of said access_size; and placing said size of said memory access minus one in a sixteen least significant bits of said access_size.

3. The method of testing a memory access as claimed in claim 1 wherein said defined memory segment has a size of 4 Gigabytes and said step of concatenating a set of high order bits comprises the substeps of:

placing sixteen "0" bits into a sixteen most significant bits of said access_size; and placing said size of said memory access minus one in a sixteen least significant bits of said access_size.

4. The method of testing a memory access as claimed in claim 1 wherein said step of concatenating a set of high order bits comprises inverting a memory segment size bit and placing said inverted memory segment size bit value into a sixteen most significant bits of said access_size.

5. The method of testing a memory access as claimed in claim 4 wherein said memory segment size bit comprises a D-bit in an Intel® Architecture compatible microprocessor.

6. The method of testing a memory access as claimed in claim 1 wherein said step of generating an effective address for said memory access comprises the substeps of multiplying an index by a scale to generate a product; and adding said product, a base address, and a displacement to create said effective address.

7. An apparatus for testing if a memory access falls above a defined memory segment, said apparatus comprising the elements of:

an effective address calculator for generating an effective address for a memory access into a memory segment;

an access size register, said access size register for storing a size of a memory access minus one;

an adder coupled to said effective address calculator and said access size register for adding said effective address and said size of said memory access minus one; and a most significant bit generator coupled to said access size register, said most significant bit generator for filling said access size register with bits such that said adder will propagate a carry from a most significant bit of said adder if said memory access reaches above said memory segment.

8. The apparatus for testing a memory access as claimed in claim 7 wherein said most significant bit generator comprises an inverter coupled to a memory segment size bit.

9. The apparatus for testing a memory access as claimed in claim 8 wherein said inverter is further coupled to the sixteen most significant bits of said access size register.

10. The apparatus for testing a memory access as claimed in claim 7 wherein said most significant bit generator fills said upper sixteen bits of said access size register and said size of a memory access minus one fills a lower sixteen bits of said access size register.

11. The apparatus for testing a memory access as claimed in claim 7 wherein said apparatus is implemented in an Intel® Architecture compatible microprocessor.

* * * * *